Jan. 26, 1937. E. S. SAVAGE Re. 20,255

SPINNING TOP

Original Filed April 24, 1936

INVENTOR

Edward S. Savage

BY

ATTORNEY

Reissued Jan. 26, 1937

Re. 20,255

UNITED STATES PATENT OFFICE 20,255

SPINNING TOP

Edward S. Savage, Rochester, N. Y.

Original No. 2,051,748, dated August 18, 1936, Serial No. 76,209, April 24, 1936. Application for reissue October 20, 1936, Serial No. 106,700

32 Claims. (Cl. 46—49)

This invention relates to spinning tops, and more particularly to a top of that class in which the top is composed of more than one member and in which one or more of the members is given motion relative to another member while the top is spinning.

An object of my invention is to provide a top of the above mentioned class in which a movable member is given comparatively slow motion relative to the spinning member, by simple and inexpensive means, thus dispensing with the more complex and expensive speed reduction means heretofore used to accomplish similar results.

Another object of my invention is to provide a top having simple and novel means for exhibiting and automatically causing periodic changes and variations of color effects.

A further object of the invention is to provide a top which will produce variable and intermittent sounds while spinning.

To these and other ends, the invention resides in certain improvements and combination of parts, all as will be hereinafter more fully described.

Figure 1:
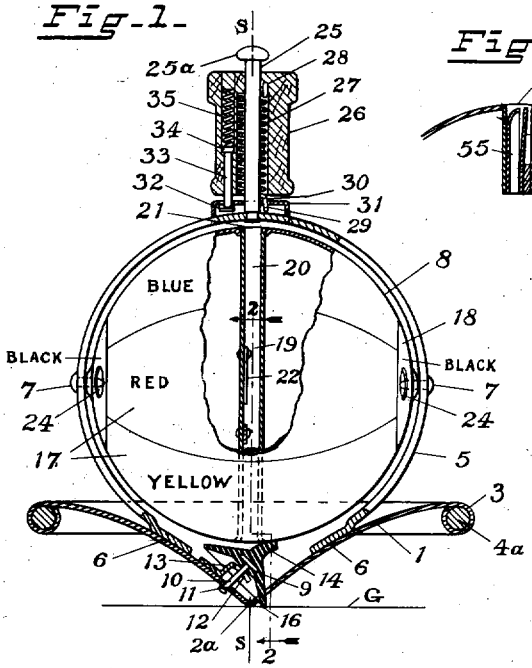
Fig. 1 is a side elevation, with a portion shown in central section of a top constructed in accordance with a preferred embodiment of the invention.

The same reference numerals throughout the several views indicate the same parts. The surface, of whatever nature, on which the top spins, will be designated in the specifications and appended claims as the "ground" and this designation is intended to include not only rigid surfaces but a movable surface such as an auxiliary surface which may be pivotally associated with the spinning member of the top.

Figure 2:
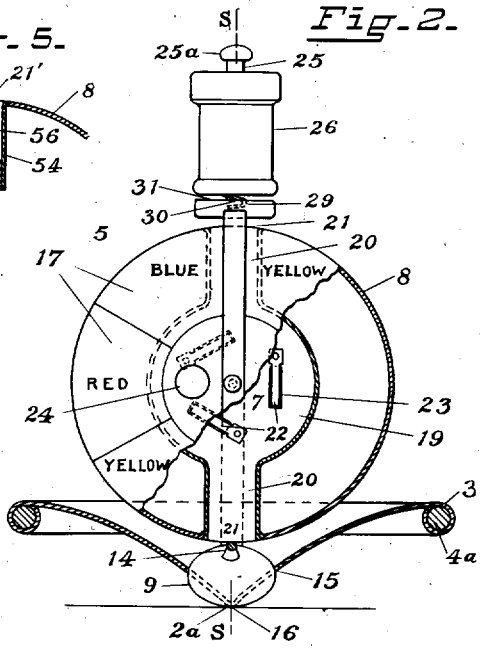
Fig. 2 shows the top in side elevation from a position at right angles to that of Fig. 1, with a portion of the sphere broken away and shown in central section and the lower part shown in section on the line 2 2, Fig. 1.

Referring first to the construction shown in Figs. 1 and 2, I provide a spinning member 1, preferably formed of sheet metal, which approximates an inverted cone in shape, with its apex 2a serving as the spinning point or peg, here shown in contact with the ground G. The rim 3 of the spinning member 1 is curled about the solid metal ring 4a which gives added weight to the periphery. A circular ring shaped member 5, formed of flat wire, is rigidly attached to the spinning member 1 at the points 6, preferably by spot welding, and is positioned with its geometrical center in line with the spinning axis of the top, which spinning axis is indicated by the broken lines S S in the several views. The ring 5 carries two bearing pins 7, projecting inwardly through holes pierced in the ring, and located axially in line with a horizontal diametrical line through the center of the ring 5. A hollow sphere 8 is journalled to rotate on the bearing pins 7. A cone shaped tracking roller 9, preferably made of rubber, is carried by and turns with its axial metal spindle 10, which is journalled to turn freely in bearings 11 and 12 formed on the body member 1, the axis of rotation being here shown positioned in angular relation to the spinning axis of the top. The upper bearing 12, which is formed in the bracket 13, is slotted as shown, permitting the roller 9 and its spindle 10 to have limited angular play in a vertical plane, as the spindle pivots slightly about its lower bearing 11. The cone shaped rubber roller 9 is extended at its apex to form a comparatively small round resilient finger 14, the center line of which is normally in line with the center line of the spindle 10. Fig. 1 of the drawing shows this finger 14 in a bent or flexed position and bearing against the sphere 8. The lower edge of the roller member 9 extends downwardly through a suitable opening 15, in the sheet metal spinning member 1, the roller making contact with the ground at the point 16. This ground contact point is preferably located close to but laterally offset with respect to the spinning axis S S.

When the top is spinning, the roller 9 will be caused to rotate with respect to the spinning member 1, because of its ground contact and the resultant rotation of the finger 14, while pressing against the sphere 8, will cause the sphere 8 to rotate on the bearing pins 7, at a slow rate of speed as compared with the speed of rotation of the spinning member 1 about the spinning axis.

The surface of the sphere 8 is colored in various designs, preferably of contrasting colors, to give interesting changing color effects while the top is spinning. I prefer to use the color design here illustrated wherein the three primary colors, blue, red and yellow are employed. The surface of the sphere is divided into six equal lunes 17, the boundary circles of which intersect at common points located in the horizontal axis of rotation of the sphere. These lunes are colored successively, blue, red and yellow, so that diametrically opposite lunes will be of like color. A black circular area 18 surrounds each bearing center, its diameter being approximately one third the diameter of the sphere. The purpose of the black areas is to prevent mixing of other colors in the center color band, as the moment when any pair of like colored lunes occupy the horizontal, or equitorial position, which is the position in which the red lunes are shown in the drawing.

The hollow sphere 8 is here shown formed of sheet metal. A flat circular chamber 19 also formed of sheet metal, is centrally located within the sphere and is supported by the flat tubular extensions 20, which are fitted into two diametrically opposite openings 21 in the sphere wall. These tubular extensions form air ducts, permitting air to enter the chamber 19 when in the position shown in the drawing. Musical reeds 22, similar to harmonica reeds, and preferably of differing pitch, are spaced equally about one wall of the chamber 19 and riveted thereto. Corresponding slots 23, in the wall opposite each reed, permit passage of air around the reeds from the chamber 19 into the sphere 8. Perforations 24 in the sphere wall are located preferably near the axis of rotation of the sphere.

When the top is spinning rapidly the air within the sphere spins with it and the centrifugal force of this rapidly rotating air body creates an air pressure within the sphere and directed outwardly from the spinning axis. This air pressure increases at increasing distances from the spinning axis, being slightly less than atmospheric pressure at the spinning axis, and greatest at the greatest distance from the spinning axis. As the top spins the sphere is rotated about its horizontal axis at a comparatively slow rate of speed by the means already described. At the moment the sphere assumes the position shown in the drawing, air will escape through the perforations 24 and the partial vacuum thus created within the sphere will cause a circulation of air, entering the openings 21 and passing inwardly through the air ducts 20 into the chamber 19, out of the chamber through the slots 23 into the sphere, and out of the sphere through the perforations 24. The air, in passing through the slots 23 will cause the reeds 22 to vibrate, thus producing musical tones. Air will continue to circulate in this manner until, as the sphere 8 rotates about its horizontal axis, the air circulation will gradually decrease as the openings 21 approach a near horizontal position, in which position the air circulation will cease, due to the fact that the centrifugal force of the air outwardly at the openings 21 equals and balances the centrifugal force of the air at the perforations 24, both being equally distant from the spinning axis. As the sphere continues to rotate and the distance of the openings 21 from the spinning axis diminishes, air will begin to circulate as before and sound will again be produced and will gradually increase in loudness until the openings 21 again occupy the vertical positions shown in the drawing, when the sound will then reach a maximum.

It is apparent that the effect of this construction is to cause the top while spinning to emit sounds or musical tones periodically, the sound rising and falling, from zero to a maximum and down again, twice for each revolution of the sphere about its horizontal axis. It is also obvious that, instead of the harmonica type of sounding means here shown, any other suitable type of air actuated sounding means may be employed, as for instance the common toy horn type of sounding reed, or a whistle type sounder which requires no reed.

It is also pointed out that the air actuated sounder need not necessarily be located close to the center of the sphere but may be located at any convenient place in the air circulation system where the air stream is sufficiently concentrated to actuate the sounder. A position near the center of the sphere is advantageous, when a reed is employed as the sounding means, because there the centrifugal force is a minimum at all times and the vibration of the reed will not be affected by stresses due to centrifugal force of the reed itself. This construction is also desirable for cheapness of manufacture and assembling of parts when a plurality of sounding reeds are employed.

Figure 5:
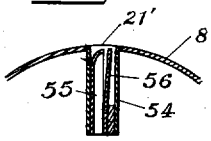
Fig. 5 is a sectional view in elevation showing a modification of the sounding means.

While the construction and location of the sounding means described in the foregoing has the advantages pointed out, the invention is not limited to that construction. Both the chamber 19 and air ducts 20 may be dispensed with if desired and still retain the periodic sounding feature of the invention. Eliminating these members, but retaining the openings 21 and perforations 24, it is obvious that, when the top is spinning, there will be air circulation passing out of the sphere through the perforations 24 and into the sphere through the openings 21, and this air circulation will increase and diminish in the manner described in the foregoing. If then an air actuated sounder of any suitable type is placed, preferably inside the sphere, adjacent to either orifice and so positioned that air passing through the orifice must pass through the sounder, periodic sounds will be produced as the top spins. An example of such construction is illustrated in Fig. 5, which is a sectional view of a sounder located close to the opening 21', which opening in this case is a round hole adapted to fit snugly the outer end of the tube 54. The sounder here shown is the common toy horn type and is fitted tightly within the tube 54. In this position the reed 56 will be caused to vibrate and sound will be produced when the air current passes inwardly through it from outside and into the sphere. Likewise the same sounder could be placed opposite a perforation 24 in which position the bird bill member 55 would be reversed in reference to the sphere wall, so that it would be in proper position to be actuated by air passing through it outwardly.

Referring again to Figs. 1 and 2, any suitable form of spinning means may be provided for initially rotating the spinning member 1. For example, the spinning means may be carried by and extend upwardly from the upper portion of the ring 5, and may comprise a centrally located pin 25 riveted to and extending upwardly from the ring 5. A spool shaped wooden handle 26 is mounted to turn freely on the pin 25 and a coiled spring 27 fits freely in a center hole in the handle 26, its upper end being fastened against turning within the spool at 28. The lower end of the coiled spring 27 is bent to form a hook 29 which is adapted to catch into a hole 30 in the sheet metal plate 31. This plate 31 is circular in contour and is perforated at the center to fit over the pin 25 and its periphery is flanged downwardly to provide a support by means of which it is rigidly attached to the ring 5 in any suitable manner. The plate 31 is also provided with a depression 32 positioned to receive the lower end of a catch pin 33. This depression 32 is formed with a beveled bottom to function as a ratchet notch while the pin 33 functions as a pawl. When the pin 33 enters the depression 32 it prevents rotation of the handle 26 about the pin 25 in one direction but will ride out and permit rotation of the handle in the opposite direction. This ratchet action is designed to permit rotation of the handle in the direction which will cause the hook 29 to catch in the hole 30. The catch pin 33 is guided for vertical movement in a hole in the handle 26, and is provided with a head 34 which serves to limit its downward movement, the pin being normally held down by the spring 35, which bears against the head 34.

To spin the top, the body portion, preferably the spinning member 1, is grasped by one hand and the spinner handle 26 is rotated by the other hand in the direction permitted by the ratchet catch, the hook 29 catching in the hole 30 prevents rotation of the lower end of the spring 27, resulting in winding the spring about the pin 25 until the winding limit of the spring has been reached. The spinner handle is then slowly released permitting the pin 33 to enter and catch in the depression 32. The spinner handle 26 is then moved upward on the pin 25, by holding the thumb against the head 25a of the pin 25 and pulling the handle 26 upward, which may be done conveniently by two other fingers of the same hand. This upward movement of the handle 26 retracts the lower end of the pin 33 from the depression 32, thus permitting the spring 27 to quickly unwind and in so doing, rapidly rotate the top by means of the hook which is caught in the hole 30. When the spring is completely unwound the hook 29 automatically releases its hold from the hole 30 and the top will continue to spin by its momentum. As here shown the spinner handle 26 is retained on the pin 25 by the head 25a. If desired the pin 25 may be made headless, in which case the handle 26 may be removed from the pin as soon as the top starts to spin.

Figure 3:
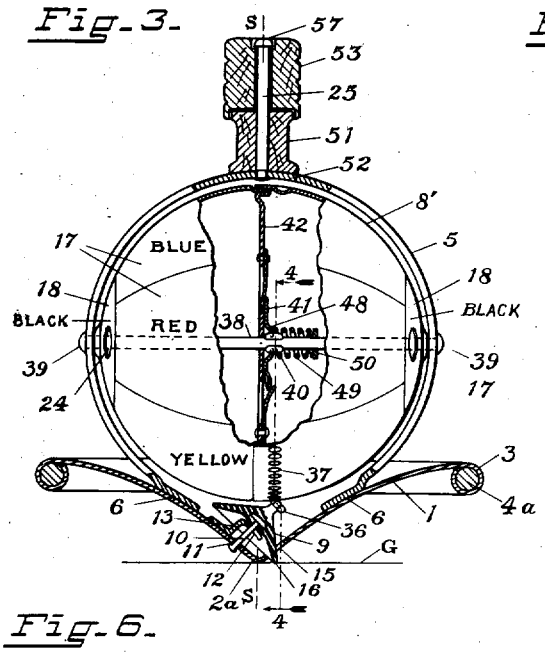
Fig. 3 is a view, in side elevation, of a modification of the invention and is shown partly in central section.
Figure 4:
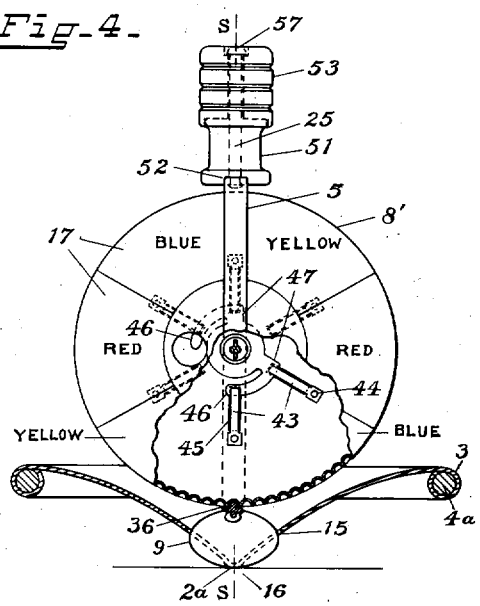
Fig. 4 is a view in side elevation, of the same modification shown in Fig. 3 taken from a position at right angles to that of Fig. 3. This view is shown partly in section on the line 4 4, Fig. 3.

Figs. 3 and 4 show a modification of my invention, some parts of which are identical in form to those shown in Figs. 1 and 2. Such parts are designated by the same reference numerals as employed in Figs. 1 and 2. In the form of the invention described above, rotation of the sphere 8 is dependent on frictional contact between the elastic finger 14 and the surface of the sphere 8. The driving force so obtained is sufficient, where there is very little resistance to rotation of the sphere 8, which condition applies to the form of the invention there illustrated. In the modification of the invention here illustrated, Figs. 3 and 4, the resistance to be overcome in rotating the sphere 8' is great enough to render a more positive driving means desirable. This object is attained by substituting for the finger 14, a toothed pinion 36 which meshes with a series of indentations 37 formed in the surface of the sphere 8', which indentations are evenly spaced in a circle about the sphere surface so as to form in effect a large gear carried by and rotating with the sphere. The pinion 36 may be mounted rigidly in respect to the spindle 10, or it may be mounted to have resilient connection to the spindle. The latter construction is that indicated in the drawing. The amount of this resiliency may be very slight, or it may be considerable, depending on the nature of the material used to connect the pinion 36 to the spindle 10. This construction permits the pinion 36 to yield slightly to adapt itself to any slight variations of the sphere surface, at the same time retaining the positive drive characteristic.

To insure constant traction of the rubber tracking roller 9 against the ground, the roller 9 is so positioned by the spindle bearings 11 and 12 that, in its uppermost position, the lower edge of the roller will normally project a trifle below the point 2a of the spinning member 1. There is therefore, when the top is spinning, a slight flexing of the roller tread at the ground contact point 16, which flexing acts to insure continuous driving contact of the roller 9 against the ground.

The modification of my invention illustrated in Figs. 3 and 4 is provided with means for producing musical tones in a mechanical manner while the top is spinning and without the use of an air current. Its action depends on the use of a musical reed, or series of reeds, which are intermittently flexed from a normally straight position and suddenly released. The sudden release of the reed causes it to vibrate for a moment and produce its characteristic tone. The sphere 8' is adapted to rotate on the horizontal shaft 38, the shaft ends being entered and riveted in holes in the ring 5 at 39. The shaft 38 is stamped near its center at 40, to form two oppositely positioned fins or keys, which serve to retain the picker plate 41 against rotation on the shaft. A sheet metal disc 42 forms a central partition within the sphere 8' and is fixed thereto so that it rotates with the sphere in a plane at right angles to the shaft 38. The musical reeds 43 are riveted at 44 to the disc 42 and are located in a circle equidistant from the horizontal axis of rotation of the sphere, and in evenly spaced relationship to each other, with the free ends of the reeds pointing toward the shaft 38, said free ends being spaced slightly away from the face of the disc 42. The disc 42 is pierced by elongated slots 45, positioned under each reed and slightly wider than the reeds. These slots permit free vibration of the reeds without impinging against the disc 42. The picker plate 41 carries two inclined picker wings 46, each extending in like circular arcs but in opposite directions, from the leading edges 47, and sloping outwardly from the face of the disc 42. The picker plate 41 is also provided with a hub 48 which is perforated at its center to fit loosely, but engaging with, the keyed portion 40 of the shaft 38. A coiled spring 49 encircles the shaft 38 and is adapted to exert a slight pressure at one end against the hub 48, to insure constant contact of the leading edges 47 of the picker plate 41, against the disc 42. The opposite end of the spring 49 bears against the collar 50 which is fixed to the shaft 38.

When the sphere 8', with its disc 42, is rotated on the shaft 38 the free ends of the reeds 43 pass successively over one of the leading edges 47 and under the other, or vice versa, depending on the direction of rotation of the disc 42. As the reed passes over a picker wing 46 the wing acts as a wedge to cause the reed to be flexed outwardly from the face of the disc 42, until the flexed reed leaves the tip of the picker wing, when it is suddenly released and snaps toward its normal position. The resulting momentary vibration of the reed will produce the desired musical tone. To produce the most pleasing sounds it is desirable that each reed have a distinctive tone differing from all of the others. When the top is spinning the sounds produced will partly carry through the perforations 24 in the sphere, and partly through the wall of the sphere.

The coloring of the sphere 8' is the same as that shown in Figs. 1 and 2, described in the foregoing, and the same change color effects will be produced when the top is spinning.

The modification shown in Figs. 3 and 4 is designed to be initially rotated by means of a string. The spinning means consists of the pin 25, the spool 51 and the handle 53. The pin 25 is riveted to, and extends upwardly from, the top of the ring 5. The wood spool 51 is drilled axially to fit tightly on the pin 25 and is fastened against turning by the slot 52 which extends across its lower face and fits over the top of the ring 5. The turned wood handle 53 is drilled to fit loosely on the pin 25 above the fixed spool 51. The head 57 of the pin 25 prevents removal of the handle 53.

To spin the top, a string is first wound about the spool 51, the handle 53 is then grasped by one hand and, while the top is held in a vertical position, the string is pulled away by the other hand causing the top to rotate rapidly about its vertical axis. The handle then being released, the top continues to spin by its momentum.

Obviously the two forms of spinning means illustrated in the drawing could be interchanged in respect to the two forms of the invention illustrated, or any other convenient form of spinning might be employed.

Figure 6:
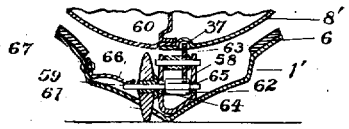
Fig. 6 shows the lower portion of a top provided with a modified form of tracking roller with geared driving connection to the rotatable member. This view corresponds to that of Fig. 3, and other portions of the top not here shown are identical to those shown in Figs. 3 and 4.

In the modified form of roller drive means shown in Fig 6, the spinning member 1' carries the U shaped bearing member 58 rigidly attached thereto. Perforations in the vertical sides of the bearing member serve as bearings for the two spindles 59 and 60. The tracking roller 61 and the pinion 62 are fixed on the spindle 59 and the gear 63 is fixed on the spindle 60. The gear 63 meshes with the pinion 62 and also with the gear 37 which is formed on the sphere surface, as shown in Figs. 3 and 4. The bearing 64, for the spindle 59, is elongated vertically to permit slight angular movement of the spindle in a vertical plane, about its other bearing 65, the fit in the bearing 65 being loose enough to permit such angular movement. This angular movement of the spindle 59 permits the tracking roller 61 to have a limited vertical movement. A flat spring 66 is riveted at one end to the spinning member 1' at 67 and its free end is positioned to exert a slight downward pressure against the projecting portion of the spindle 59 at a point adjacent to the tracking roller 61, thereby causing constant downward pressure of the roller 61 against the ground. When a spring is employed to cause downward pressure of the tracking roller against the ground, as in the construction just described, it is possible to use a tracking roller formed of an inelastic material such as wood or metal. The spring 66 may be dispensed with in the type of drive here illustrated, if the tracking roller 61 is made of an elastic material such as rubber, the resiliency of the rubber being depended on to maintain ground contact. In this case the bearing 64 should not be slotted since vertical motion of the roller 61 is not desired.

In operation, while the top is spinning, the resultant motion of the sphere 8' obtained by the use of the drive means shown in Fig. 6 is similar to that obtained by the drive means shown in Figs. 3 and 4. Rotation of the spinning member 1' about its spinning axis causes the roller 61 to rotate by reason of its ground contact and the spindle 59 and pinion 62 will thereby be caused to rotate. The intermediate gear 63 transmits the rotary motion of the pinion 62 to the gear 37 of the sphere 8' and causes it to rotate in relation to the spinning member 1' at a speed slower than that of the spinning member.

The drive means shown in the several figures of the drawing are designed to cause the rotary member, in the drawing the sphere 8 or 8', to rotate on its axis at a slower rate than the spinning member rotates about the spinning axis. This invention is not however limited to such comparative speeds of these respective members. In some adaptations of the invention it may be desirable to have the movable member actuated at a speed as fast or faster than that of the spinning member. Such results can be obtained by obvious changes in the proportions and arrangement of essential parts.

It will be understood that the details of construction herein shown and described may be varied in many respects without departing from my invention, the scope of which is indicated in the appended claims.

What I claim as my invention and desire to secure by Letters Patent is:

1. A spinning top comprising a spinning member mounted for rotation about a substantially vertical spinning axis, a second member mounted on and spinning bodily with said spinning member and also movable relatively thereto, rotary means carried by the said spinning member and operatively connected to said second member, said rotary means being adapted for ground contact at a point laterally offset with respect to said spinning axis, so that during the spinning of said spinning member said rotary means will be rotated by its ground contact and its rotation will move said second member relatively to said spinning member.

2. A top according to claim 1 in which said second member is rotatably mounted on said spinning member.

3. A top according to claim 1 in which said second member is rotatably mounted on said spinning member for rotation about a substantially horizontal axis.

4. A top according to claim 1 in which said second member is rotatably mounted on said spinning member and carries a plurality of differently colored areas.

5. A top according to claim 1 in which said second member comprises a sphere mounted on said spinning member for rotation about a substantially horizontal axis.

6. A top according to claim 1 in which resilient means is provided to cause pressure of the rotary means against the ground at the point of contact.

7. A top according to claim 1 in which at least a portion of the rotary means is composed of an elastic material and adapted to insure continuous driving force between the ground contact point and the second member.

8. A spinning top comprising a spinning member mounted for rotation about a substantially vertical spinning axis, a second member mounted on and spinning bodily with said spinning member and also movable relatively thereto, and rotary means journalled on said spinning member and comprising a roller portion of one diameter and a driver portion of smaller diameter, the said roller portion being adapted to make ground contact at a point laterally offset with respect to the said spinning axis, and said driver portion being adapted to make driving contact with the said second member so that, during the spinning of said spinning member said rotary means will ber rotated by the contact of its roller portion with the ground and the resultant rotation of its driver portion will move said second member relatively to said spinning member.

9. A spinning top comprising a spinning member mounted for rotation about a substantially vertical spinning axis, a second member rotatably mounted on and spinning bodily with said spinning member, and rotary means journalled on said spinning member and having its axis of rotation positioned in angular relation to the said spinning axis and comprising a roller portion of one diameter and a driver portion of smaller diameter, said roller portion being approximately conical in form with its outer edge adapted to make ground contact at a point laterally offset with respect to said spinning axis and said driver portion being adapted to make driving contact with the said second member so that during the spinning of the said spinning member said rotary means will be rotated by the ground contact of its roller portion and the resultant rotation of its driver portion will cause said second member to rotate relatively to said spinning member.

10. A spinning top comprising a spinning member mounted for rotation about a substantially vertical spinning axis, a second member rotatably mounted on and spinning bodily with said spinning member, and rotary means journalled on said spinning member comprising a roller portion adapted for ground contact at a point laterally offset with respect to said spinning axis and a driver portion adapted for frictional driving connection to said second member, so that during the spinning of said spinning member said rotary means will be rotated by the contact of its roller portion with the ground and the resultant rotation of its driver portion will cause said second member to rotate relatively to said spinning member.

11. A spinning top comprising a spinning member mounted for rotation about a substantially vertical spinning axis, a second member rotatably mounted on and spinning bodily with said spinning member, and rotary means journalled on said spinning member comprising a roller portion adapted for ground contact at a point laterally offset with respect to said spinning axis and a driver portion adapted for positive driving connection to said second member, so that during the spinning of said spinning member said rotary means will be rotated by the contact of its roller portion with the ground and the resultant rotation of its driver portion will cause said second member to rotate relatively to said spinning member.

12. A spinning top comprising a spinning member mounted for rotation about a substantially vertical spinning axis, a second member mounted on and spinning bodily with said spinning member, said second member being provided with circular gear means fixed thereto and adapted to rotate therewith, and rotary means journalled on said spinning member comprising a roller portion adapted for ground contact at a point laterally offset with respect to the spinning axis and a toothed driver portion meshing with the said circular gear means, so that during the spinning of said spinning member said rotary means will be rotated by the contact of its roller portion with the ground and the resultant rotation of its toothed driver portion will rotate said circular gear means and thereby cause said second member to rotate relatively to said spinning member.

13. A spinning top comprising a spinning member mounted for rotation about a substantially vertical spinning axis, a second member rotatably mounted on and spinning bodily with said spinning member, said second member being provided with circular gear means fixed thereto and adapted to rotate therewith, a roller journalled on said spinning member and adapted for ground contact at a point laterally offset with respect to the spinning axis, and geared connection between said roller and said circular gear means, so that during the spinning of said spinning member said roller will be rotated by its contact with the ground and said second member will be caused to rotate relatively to said spinning member.

14. A top according to claim 12 in which the second member comprises a sphere mounted for rotation, on said spinning member, about a substantially horizontal axis.

15. A spinning top comprising a spinning member mounted for rotation about a substantially vertical spinning axis, means carried by said spinning member for spinning said member, a sphere mounted on the spinning member for rotation relatively thereto about a substantially horizontal axis, and drive means mounted on said spinning member for rotating said sphere about said horizontal axis.

16. A top according to claim 15 in which the surface of the sphere carries a plurality of differently colored areas.

17. A spinning top comprising a spinning member mounted for rotation about a substantially vertical spinning axis, means carried by the spinning member for spinning said member, a sphere mounted on the spinning member for rotation relatively thereto about a substantially horizontal axis, ground contacting means associated with the spinning member and operatively connected to said sphere so that the sphere will be rotated about its horizontal axis while the top is spinning.

18. A top comprising a spinning member mounted for rotation about a substantially vertical spinning axis said spinning member including a superstructure, a sphere rotatably mounted on bearings carried by the superstructure for rotation about a substantially horizontal axis, vertically disposed spinning means carried by the said superstructure and positioned above the sphere axially in line with the spinning axis, and means associated with said spinning member for rotating said sphere about said horizontal axis at a rate slower than that of the rotation of said spinning member about said spinning axis.

19. A spinning top comprising a spinning member mounted for rotation about a substantially vertical spinning axis, means carried by the spinning member for spinning said member, a hollow sphere mounted on the spinning member and adapted for rotation relatively thereto about a substantially horizontal axis, sounding means carried by the sphere for producing sounds at periodic intervals controlled by the rotation of said sphere while the top is spinning, and drive means associated with said spinning member for rotating said sphere about said horizontal axis at a rate slower than that of the rotation of said spinning member about said spinning axis.

20. A top according to claim 19 in which the surface of the sphere carries a plurality of differently colored areas.

21. A top according to claim 19 in which the sounding means comprises a reed supported within the sphere and means for flexing and suddenly releasing said reed to cause vibration thereof.

22. A spinning top comprising a spinning member mounted for rotation about a substantially vertical spinning axis, a hollow sphere mounted on the spinning member and adapted for rotation relatively thereto about a substantially horizontal axis, said sphere having apertures in the wall thereof so positioned in relation to each other and to the axis of rotation that the centrifugal force of the air within the sphere when the top spins will cause periodic circulation of air through the said apertures, the timing of such periods of circulation being controlled by the rotation of the sphere about its horizontal axis, and drive means carried by the spinning member and operatively connected to the sphere to cause the sphere to rotate about its horizontal axis.

23. A spinning top according to claim 22 further comprising sounding means operated by said circulation of air within the said sphere.

24. A spinning top comprising a spinning member mounted for rotation about a spinning axis, a body generally rounded in shape mounted on the spinning member for rotation relatively thereto about a second axis at a substantial angle to the said spinning axis, and drive means mounted on said spinning member for rotating said body about said second axis.

25. A top according to claim 24 in which the surface of the body carries a plurality of differently colored areas.

26. A spinning top comprising a spinning member mounted for rotation about a spinning axis, a body generally rounded in shape mounted on the spinning member for rotation relatively thereto about a second axis at a substantial angle to the said spinning axis, ground contacting means associated with the spinning member and operatively connected to said body so that the body will be rotated about the second axis while the top is spinning.

27. A top comprising a spinning member mounted for rotation about a spinning axis, said spinning member including a superstructure, a body generally rounded in shape rotatably mounted on bearings carried by the superstructure for rotation about a second axis at a substantial angle to the said spinning axis, and means associated with said spinning member for rotating said body about said second axis at a rate slower than that of the rotation of said spinning member about said spinning axis.

28. A spinning top comprising a spinning member mounted for rotation about a spinning axis, a hollow body mounted on the spinning member for rotation relatively thereto about a second axis at a substantial angle to the said spinning axis, sounding means carried by the body for producing sounds at periodic intervals controlled by the rotation of said hollow body while the top is spinning, and drive means associated with said spinning member for rotating said hollow body about said second axis at a rate slower than that of the rotation of said spinning member about said spinning axis.

29. A top according to claim 28 in which the surface of the hollow body carries a plurality of differently colored areas.

30. A top according to claim 28 in which the sounding means comprises a reed supported within the hollow body and means for flexing and suddenly releasing said reed to cause vibration thereof.

31. A spinning top comprising a spinning member mounted for rotation about a spinning axis, a hollow body mounted on the spinning member and adapted for rotation relatively thereto about a second axis at a substantial angle to the said spinning axis, said hollow body having apertures in the wall thereof so positioned in relation to each other and to the second axis that the centrifugal force of the air within the hollow body when the top spins will cause periodic circulation of air through the said apertures, the timing of such periods of circulation being controlled by the rotation of the hollow body about the second axis, and drive means carried by the spinning member and operatively connected to the hollow body to cause said hollow body to rotate about the second axis.

32. A spinning top according to claim 31 further comprising sounding means operated by said circulation of air within the hollow body.

EDWARD S. SAVAGE.